(12) United States Patent
Dörr et al.

(10) Patent No.: US 10,233,279 B2
(45) Date of Patent: Mar. 19, 2019

(54) POLY(THF)-BASED POLYURETHANE DISPERSIONS

(75) Inventors: Sebastian Dörr, Düsseldorf (DE); Hans Georg Grablowitz, Köln (DE); Thomas Feller, Solingen (DE); Thomas Michaelis, Leverkusen (DE)

(73) Assignee: Covestro-Deutschland AG (DE)

( * ) Notice: Subject to any disclaimer, the term of this patent is extended or adjusted under 35 U.S.C. 154(b) by 747 days.

(21) Appl. No.: 13/376,807

(22) PCT Filed: Jun. 1, 2010

(86) PCT No.: PCT/EP2010/003327
§ 371 (c)(1),
(2), (4) Date: Dec. 30, 2011

(87) PCT Pub. No.: WO2010/142393
PCT Pub. Date: Dec. 16, 2010

(65) Prior Publication Data
US 2012/0121902 A1    May 17, 2012

(30) Foreign Application Priority Data
Jun. 10, 2009  (EP) .................................. 09075258

(51) Int. Cl.
| | | |
|---|---|---|
| *D02G 3/00* | (2006.01) | |
| *C08G 18/48* | (2006.01) | |
| *C08G 18/08* | (2006.01) | |
| *C08G 18/12* | (2006.01) | |
| *C08G 18/28* | (2006.01) | |
| *C08G 18/72* | (2006.01) | |
| *C09D 175/08* | (2006.01) | |
| *C09J 175/08* | (2006.01) | |

(52) U.S. Cl.
CPC ..... *C08G 18/4854* (2013.01); *C08G 18/0828* (2013.01); *C08G 18/12* (2013.01); *C08G 18/283* (2013.01); *C08G 18/4808* (2013.01); *C08G 18/722* (2013.01); *C09D 175/08* (2013.01); *C09J 175/08* (2013.01); *C08G 2170/80* (2013.01); *C08G 2190/00* (2013.01); *Y10T 428/2933* (2015.01)

(58) Field of Classification Search
CPC ............ C08G 18/4854; C08G 18/0828; C08G 18/12; C08G 18/283; C08G 18/4808; C08G 18/722
USPC .......................................................... 428/375
See application file for complete search history.

(56) References Cited

U.S. PATENT DOCUMENTS

| | | | |
|---|---|---|---|
| 5,075,408 A * | 12/1991 | Suzuki et al. ................... 528/76 |
| 5,916,965 A * | 6/1999 | Matsumoto et al. .......... 524/591 |
| 2003/0105219 A1* | 6/2003 | Schutze et al. ............... 524/589 |
| 2006/0128885 A1* | 6/2006 | Rische et al. ................. 524/589 |
| 2007/0049684 A1 | 3/2007 | Rische et al. |
| 2007/0259984 A1 | 11/2007 | Dorr et al. |
| 2008/0070999 A1 | 3/2008 | Mager et al. |
| 2011/0275728 A1 | 11/2011 | Schonberger et al. |

FOREIGN PATENT DOCUMENTS

| | | |
|---|---|---|
| DE | 101 22 444 | 11/2002 |
| DE | 10 2006 020 745 | 11/2007 |
| DE | 10 2006 043 589 | 3/2008 |
| WO | 2006/075144 | 7/2006 |
| WO | 2007/022885 | 3/2007 |
| WO | 2010/083953 A1 | 7/2010 |

OTHER PUBLICATIONS

International Search Report for PCT/EP2010/003327 dated Nov. 5, 2010.

* cited by examiner

*Primary Examiner* — Vincent Tatesure
(74) *Attorney, Agent, or Firm* — Drinker Biddle & Reath LLP

(57) ABSTRACT

The present invention relates to novel aqueous polyurethane dispersions produced using at least two poly(tetramethylene glycol) polyether polyols with different average molar masses and at least two different polyisocyanate components.

20 Claims, No Drawings

POLY(THF)-BASED POLYURETHANE DISPERSIONS

CROSS REFERENCE TO RELATED APPLICATIONS

This application is a § 371 National Stage Application of PCT/EP2010/003327, filed Jun. 1, 2010, which claims priority to European Application No. 09075258.5, filed Jun. 10, 2009.

BACKGROUND OF THE INVENTION

Field of the Invention

The present invention relates to novel aqueous polyurethane dispersions produced using at least two poly(tetramethylene glycol) polyether polyols with different average molar masses and at least two different polyisocyanate components.

Description of Related Art

Aqueous polyurethane dispersions are known in the literature, for example as the basis of coating compositions and adhesives. These dispersions have a broad range of adjustable properties. However, it is not always possible to produce films with the desired property profile, for example because the necessary composition of the suitable building blocks does not lead to a stable dispersion.

Owing to their excellent low-temperature flexibility and elasticity, polyurethane dispersions are also used for the coating of textile supports. In this case, it is particularly important that the polymers are, as far as possible, built up from building blocks having a low tendency towards hydrolysis.

In WO-07022885, elastic polyurethane dispersions are disclosed which are built up from polyester polyols with a high proportion of ethylene glycol and/or diethylene glycol. Owing to the unstable ester bonds, however, the products are not stable to hydrolysis.

In DE-A 10122444, polyurethane dispersions based on polycarbonate and polytetramethylene glycol are described, which also exhibit high elasticity. However, the disclosed dispersions exhibit an elongation which is significantly below 1000%.

In WO-06075144, polyurethane solutions built up from diisocyanates, polytetramethylene glycols and polyimines are disclosed, the films of which exhibit high elasticity. The products are not aqueous, however, and therefore not sufficiently environmentally friendly.

SUMMARY

The object of the present invention was to provide aqueous polyurethane dispersions which lead to films with high elasticity, good mechanical properties and a pleasant feel.

The object was achieved by the provision of novel aqueous polyurethane dispersions produced using at least two poly(tetramethylene glycol) polyether polyols with different average molar masses and at least two different polyisocyanate components.

The present therefore provides aqueous polyurethane dispersions produced using at least two poly(tetramethylene glycol) polyether polyols ((HO—(CH$_2$—CH$_2$—CH$_2$—CH$_2$—O)$_x$—H) with different number-average molecular weights M$_n$ A2a) and A2b), wherein the relevant diol precursors are present with number-average molecular weights M$_n$ of 400 to 8000 g/mol, preferably 600 to 3000 g/mol, and the diol with the lower molar mass A2a) has a number-average molecular weight M$_n$ which is 10 to 80%, preferably 30 to 70%, of the number-average molecular weight M$_n$ of the diol with the higher molar mass A2b). The determination of the number-average molecular weight M$_n$ takes place by gel permeation chromatography against a polystyrene standard in tetrahydrofuran at 23° C.

DETAILED DESCRIPTION OF A PREFERRED EMBODIMENT

Preferred are aqueous polyurethane dispersions comprising polyurethanes obtainable from A1) at least two organic di- or polyisocyanates that are different from one another, A2) at least two poly(tetramethylene glycol) polyether diols A2a) and A2b) that are different from one another, each with the structure (HO—(CH$_2$—CH$_2$—CH$_2$—CH$_2$—O)$_x$—H), wherein the relevant diol precursors are present with number-average molecular weights M$_n$ of 400 to 8000 g/mol and the diol with the lower molar mass A2a) has a number-average molecular weight M$_n$ which is 10 to 80% of the number-average molecular weight M$_n$ of the diol with the higher molar mass A2b), A3) optionally hydroxy-functional compounds with molecular weights of preferably 62 to 399 g/mol, and A4) optionally non-ionic hydrophilising agents, and one or more amino-functional compounds B).

The dispersion preferably contains less than 20 wt. %, particularly preferably less than 10 wt. %, most particularly preferably less than 5 wt. %, of diol precursors with number-average molecular weights M$_n$ of 400 to 8000 g/mol, based in each case on the total amount of the polyurethane, which do not correspond to A2).

Even more preferably, no diol precursors are contained which do not correspond to A2).

Particularly preferred are aqueous polyurethane dispersions comprising polyurethanes consisting of A1) two organic di- or polyisocyanates that are different from one another, A2) two poly(tetramethylene glycol) polyether diols A2a) and A2b) that are different from one another, each with the structure (HO—(CH$_2$—CH$_2$—CH$_2$—CH$_2$—O)$_x$—H), wherein the relevant diol precursors are present with number-average molecular weights M$_n$ of 400 to 8000 g/mol and the diol with the lower molar mass A2a) has a number-average molecular weight M$_n$ which is 10 to 80% of the number-average molecular weight M$_n$ of the diol with the higher molar mass A2b), and one or more amino-functional compounds B).

Polyurethanes within the meaning of the invention are polymeric compounds which have at least two, preferably at least three urethane group-containing repeating units with the following structure:

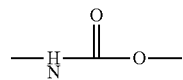

According to the invention, those polyurethanes are also included which, as a result of their production, also have urea group-containing repeating units with the following structure:

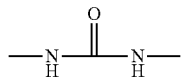

as are formed during the reaction of the isocyanate-terminated prepolymers A) with the amino-functional compounds B).

In a preferred embodiment, the aqueous polyurethane dispersions essential to the invention are produced in that
A) isocyanate-functional prepolymers are produced from
  A1) at least two organic di- or polyisocyanates that are different from one another,
  A2) at least two poly(tetramethylene glycol) polyether diols A2a) and A2b) that are different from one another, each with the structure (HO—$(CH_2$—$CH_2$—$CH_2$—$CH_2$—$O)_x$—H), wherein the relevant diol precursors are present with number-average molecular weights $M_n$ of 400 to 8000 g/mol, preferably 600 to 3000 g/mol, and the diol with the lower molar mass A2a) has a number-average molecular weight $M_n$ which is 10 to 80%, preferably 30 to 70%, of the number-average molecular weight $M_n$ of the diol with the higher molar mass A2b),
  A3) optionally hydroxy-functional compounds with molecular weights of preferably 62 to 399 g/mol, and
  A4) optionally non-ionic hydrophilising agents
  and
B) their free NCO groups are then reacted in full or in part with one or more amino-functional compounds B), such as primary and/or secondary amines and/or diamines, the polyurethanes thus obtained being dispersed in water before, during or after step B).

In a particularly preferred embodiment, A2a) has a number-average molecular weight $M_n$ of 400 to 1500, particularly preferably of 600 to 1200, most particularly preferably of 1000 g/mol. At the same time A2b) has a number-average molecular weight $M_n$ of 1500 to 8000, particularly preferably of 1800 to 3000, most particularly preferably of 2000 g/mol.

The weight ratio of A2a) to A2b) is preferably in the range from 0.1 to 10, particularly preferably in the range from 0.2 to 10, most particularly preferably in the range from 1 to 6.

In a particularly preferred embodiment the polyurethane dispersion according to the invention has no other diols with number-average molecular weights $M_n$ of 400 to 8000 g/mol.

The polyurethanes that are essential to the invention are preferably linear or branched molecules, particularly preferably linear molecules.

The number-average molecular weight of the polyurethanes preferably used according to the invention is typically 1000 to 200000 g/mol, preferably 5000 to 150000 g/mol.

In the production of the polyurethanes that are essential to the invention, the production of an isocyanate-functional prepolymer A) particularly preferably takes place first, and then in a second step B) the reaction of the isocyanate-functional prepolymer A) with one diamine or several diamines with chain extension. In addition, it is possible to add monofunctional amines as chain terminators to control the molecular weight.

As component B), on the one hand amines can preferably be used which have no ionic or ionogenic groups, such as anionically hydrophilising groups (referred to below as component B1)) and on the other hand, in addition amines are preferably used which have ionic or ionogenic groups, such as anionically hydrophilising groups (referred to below as component B2)).

Preferably in step B), the reaction of the prepolymer A), a mixture of the components B1) and the components B2) is reacted. By using the component B1) a high molar mass can be built up without the viscosity of the previously produced isocyanate-functional prepolymer increasing to a degree that would hinder processing. The polyurethanes used according to the invention preferably have anionic groups, preferably sulfonate groups. These anionic groups are introduced into the polyurethanes used according to the invention via the amine component B2) used in step B). The polyurethanes used according to the invention optionally additionally contain non-ionic components for hydrophilising purposes. Particularly preferably, exclusively sulfonate groups are contained in the polyurethanes used according to the invention for hydrophilising, which are introduced into the polyurethane via corresponding diamines as component B2).

In order to achieve good sedimentation stability, the number-average particle size of the special polyurethane dispersions is preferably less than 750 nm, particularly preferably less than 500 nm, most particularly preferably in the range from 20 to 450 nm determined by laser correlation spectroscopy after dilution with deionised water (instrument: Malvern Zetasizer 1000, Malvern Inst. Limited). The solids content of the polyurethane dispersions according to the invention is generally 10 to 70, preferably 30 to 65, particularly preferably 40 to 60 wt. %. The solids contents are determined by heating a weighed sample to 125° C. until constant weight is reached. At constant weight, the solids content is calculated by weighing the sample again.

These polyurethane dispersions preferably have less than 5 wt. %, particularly preferably less than 0.2 wt. %, based on the mass of the dispersions, of unbound organic amines. Suitable polyisocyanates of component A1) are the aliphatic, aromatic or cycloaliphatic polyisocyanates with an NCO functionality of greater than or equal to 2 which are known per se to the person skilled in the art. At least two different di- or polyisocyanates are used here, the weight ratio in the case of two isocyanate components preferably being in the range from 1.05 to 10, particularly preferably in the range from 1.1 to 5 and most particularly preferably in the range from 1.5 to 3 (component with the higher proportion by mass divided by component with the lower proportion by mass).

In a preferred embodiment, only diisocyanate components are incorporated as polyisocyanate component A1) and in a particularly preferred variant, precisely two different diisocyanate components A1) are incorporated.

Examples of these suitable diisocyanates are 1,4-butylene diisocyanate, 1,6-hexamethylene diisocyanate (HDI), isophorone diisocyanate (IPDI), 2,2,4- and/or 2,4,4-trimethyl-hexamethylene diisocyanate, the isomeric bis(4,4'-isocyanatocyclohexyl)methanes or mixtures thereof with any isomer content, 1,4-cyclohexylene diisocyanate, 1,4-phenylene diisocyanate, 2,4- and/or 2,6-toluene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI) and alkyl-2,6-diisocyanatohexanoate (lysine diisocyanate) with C1-C8 alkyl groups.

In addition to the aforementioned polyisocyanates, it is also possible to use portions of modified diisocyanates having a functionality of ≥2 with uretdione, isocyanurate, urethane, allophanate, biuret, iminooxadiazinedione or oxadiazinetrione structure and mixtures of these.

Preferably used are polyisocyanate mixtures of the aforementioned type with exclusively aliphatically or cycloaliphatically bonded isocyanate groups or mixtures of these and an average NCO functionality of the mixture of 2 to 4, particularly preferably 2 to 2.6, more particularly preferably 2 to 2.4 and most particularly preferably 2.

As component A1), diisocyanates selected from the group consisting of hexamethylene diisocyanate, isophorone diisocyanate, isomeric bis(4,4'-isocyanatocyclohexyl)methanes and mixtures thereof are particularly preferably used.

As component A2), at least two poly(tetramethylene glycol) polyether diols A2a) and A2b) with the structure (HO—(CH$_2$—CH$_2$—CH$_2$—CH$_2$—O)$_x$—H)) are present, the relevant diols being present with number-average molecular weights M$_n$ of 400 to 8000 g/mol, preferably 600 to 3000 g/mol, and the diol with the lower molar mass A2a) having a number-average molecular weight M$_n$ which is 10 to 80%, preferably 30 to 70%, of the number-average molecular weight M$_n$ of the diol with the higher molar mass A2b).

In addition to the poly(tetramethylene glycol) polyether diols with the structure (HO—(CH$_2$—CH$_2$—CH$_2$—CH$_2$—O)$_x$—H)), additional polymeric polyols may be contained, preferably in quantities of 0 to 20 wt. %, particularly preferably in quantities of 0 to 10 wt. %, most particularly preferably in quantities of 0 to 5 wt. % based on the total component A2). These are the polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols and polyester polycarbonate polyols which are known per se in polyurethane coatings technology. In addition, these may be used individually or in any mixtures with one another as component A2). Preferably only poly(tetramethylene glycol) polyether diols are used as component A2).

These poly(tetramethylene glycol) polyether diols (poly-tetramethylene glycol polyethers) are obtainable e.g. by polymerisation of tetrahydrofuran by means of cationic ring opening.

As component A3) it is possible to use any polyols, preferably non-polymeric polyols, in the molecular weight range mentioned as preferred of 62 to 399 mol/g with up to 20 carbon atoms, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl)propane), trimethylolpropane, trimethylolethane, glycerol, pentaerythritol and any mixtures thereof with one another.

Also suitable are ester diols in the molecular weight range mentioned, such as α-hydroxybutyl-ε-hydroxycaproic acid ester, ω-hydroxyhexyl-γ-hydroxybutyric acid ester, adipic acid (β-hydroxyethyl) ester or terephthalic acid bis(β-hydroxyethyl) ester.

Furthermore it is also possible to use monofunctional isocyanate-reactive hydroxyl group-containing compounds as component A3). Examples of these monofunctional compounds are ethanol, n-butanol, ethylene glycol monobutyl ether, diethylene glycol monomethyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol and 1-hexadecanol.

In a preferred embodiment of the invention, the polyurethane used according to the invention contains 0 to 10 wt. % of component A3), particularly preferably 0 to 5 wt. % of component A3), based in each case on the total mass of the polyurethane.

As component A4) for the production of the polyurethanes used according to the invention, optionally one or more isocyanate-reactive non-ionic hydrophilising agents are used.

Suitable non-ionic hydrophilising compounds as component A4) are e.g. polyoxyalkylene ethers which have isocyanate-reactive groups, such as hydroxy, amino or thiol groups. Preferred are monohydroxy-functional polyalkylene oxide polyether alcohols having a statistical average of preferably 5 to 70, particularly preferably 7 to 55 ethylene oxide units per molecule, as can be obtained in a known manner by alkoxylation of suitable starter molecules (e.g. in Ullmanns Encyclopädie der technischen Chemie, 4$^{th}$ edition, vol. 19, Verlag Chemie, Weinheim pp. 31-38). These are either pure polyethylene oxide ethers or mixed polyalkylene oxide ethers, which preferably contain at least 30 mole %, particularly preferably at least 40 mole %, ethylene oxide units, based on all the alkylene oxide units contained.

Particularly preferred non-ionic compounds are monofunctional mixed polyalkylene oxide polyethers having 40 to 100 mole % ethylene oxide and 0 to 60 mole % propylene oxide units.

Suitable starter molecules for these non-ionic hydrophilising agents are preferably saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as e.g. diethylene glycol monobutyl ether, unsaturated alcohols such as allyl alcohol, 1,1-dimethyl allyl alcohol or oleic alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropyl-amine, dibutylamine, bis(2-ethylhexyl)amine, N-methyl- and N-ethylcyclohexyl-amine or dicyclohexylamine and heterocyclic secondary amines such as morpholine, pyrrolidine, piperidine or 1H-pyrazole. Preferred starter molecules are saturated monoalcohols of the above-mentioned type. Particularly preferably used as starter molecules are diethylene glycol monobutyl ether or n-butanol.

Suitable alkylene oxides for the alkoxylation reaction are preferably ethylene oxide and propylene oxide, which can be used in any order or in a mixture during the alkoxylation reaction.

Component B) is preferably selected from primary or secondary amine and/or diamines. It particularly preferably comprises diamines.

As component B) it is particularly preferable to use amines that have no ionic or ionogenic groups, such as anionically hydrophilising groups (hereinafter component B1)), and it is also particularly preferable to use amines that have ionic or ionogenic groups, such as anionically hydrophilising groups (hereinafter component B2)). Most particularly preferably in step B) of the reaction of the prepolymer a mixture of component B1) and component B2) is reacted.

As component B1), for example organic di- or polyamines, such as e.g. 1,2-ethylene-diamine, 1,2- and 1,3-diaminopropane, 1,4-diaminobutane, 1,6-diaminohexane, isophorone diamine, mixtures of isomers of 2,2,4- and 2,4,4-trimethylhexamethylenediamine, 2-methylpentamethylenediamine, diethylenetriamine, 4,4-diaminodicyclohexylmethane, hydrazine hydrate and/or dimethylethylenediamine can be used.

Moreover, it is also possible to use as component B1) compounds which, in addition to a primary amino group, also have secondary amino groups or in addition to an amino group (primary or secondary) also have OH groups. Examples of these are primary/secondary amines, such as diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol or neopentanolamine.

Furthermore it is also possible to use as component B1) monofunctional, isocyanate-reactive amine compounds, such as e.g. methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine or suitable substituted derivatives thereof, amide amines from diprimary amines and monocarboxylic acids, monoketime of diprimary amines or primary/tertiary amines, such as N,N-dimethylaminopropylamine.

As component B1), 1,2-ethylenediamine, bis(4-aminocyclohexyl)methane, 1,4-diaminobutane, isophorone diamine, ethanolamine, diethanolamine and diethylenetriamine are particularly preferably used.

Most particularly preferably, component B) comprises at least one component B2) that has an anionically hydrophilising action. Such amines of component B2) preferably contain a sulfonic acid or sulfonate group, particularly preferably a sodium sulfonate group. Suitable anionically hydrophilising compounds as component B2) are preferably the alkali metal salts of mono- and diaminosulfonic acids. Examples of these anionic hydrophilising agents are salts of 2-(2-aminoethylamino)ethanesulfonic acid, ethylenediamine propyl- or -butylsulfonic acid, 1,2- or 1,3-propylenediamine-β-ethylsulfonic acid or taurine. In addition, the salt of cyclohexylaminopropanesulfonic acid (CAPS) from WO-A 01/88006 can be used as an anionic hydrophilising agent.

Most particularly preferred anionic hydrophilising agents B2) are those that contain sulfonate groups as the ionic groups and two amino groups, such as the salts of 2-(2-aminoethylamino)ethylsulfonic acid and 1,3-propylenediamine-β-ethylsulfonic acid.

The polyurethanes used according to the invention particularly preferably contain at least one sulfonate group.

The anionic group in component B2) may optionally also be a carboxylate or carboxylic acid group. The component B2) is then preferably selected from diaminocarboxylic acids.

For the purpose of hydrophilising, it is also possible to use mixtures of anionic hydrophilising agents B2) and non-ionic hydrophilising agents A4).

In a preferred embodiment for the production of the special polyurethane dispersions, the components A1) to A4) and B1) to B2) are used in the following quantities, with the individual quantities always adding up to 100 wt. %:
5 to 40 wt. % component A1),
55 to 90 wt. % component A2),
0.5 to 20 wt. % sum of components A3) and/or B1),
0.1 to 25 wt. % sum of components A4) and/or B2), wherein, based on the total quantities of components A1) to A4) and B1) to B2), particularly preferably 0.1 to 5 wt. % of anionic or potentially anionic hydrophilising agents B2) are used.

In a particularly preferred embodiment for the production of the special polyurethane dispersions, the components A1) to A4) and B1) to B2) are used in the following quantities, with the individual quantities always adding up to 100 wt. %:
5 to 35 wt. % component A1),
60 to 90 wt. % component A2),
0.5 to 15 wt. % sum of components A3) and/or B1),
0.1 to 15 wt. % sum of components component A4) and/or B2), wherein, based on the total quantities of components A1) to A4) and B1) to B2), particularly preferably 0.2 to 4 wt. % of anionic or potentially anionic hydrophilising agents B2) are used.

In a most particularly preferred embodiment for the production of the special polyurethane dispersions, the components A1) to A4) and B1) to B2) are used in the following quantities, with the individual quantities always adding up to 100 wt. %:
10 to 30 wt. % component A1),
65 to 85 wt. % component A2),
0.5 to 14 wt. % sum of components A3) and/or B1),
0.1 to 13.5 wt. % sum of components A4) and/or B2), wherein, based on the total quantities of components A1) to A4) and B1) to B2), particularly preferably 0.5 to 3.0 wt. % of anionic or potentially anionic hydrophilising agents from B2) are used.

The production of the polyurethane dispersions can be performed in one or more step(s) in a homogeneous phase or, in a multi-step reaction, partly in a disperse phase. After polyaddition of A1) to A4) has been completely or partly carried out, a dispersing, emulsifying or dissolving step preferably takes place. This is optionally followed by a further polyaddition or modification in a disperse phase.

It is possible to use all processes known from the prior art here, such as e.g. a prepolymer mixing process, acetone process or melt dispersion process. The acetone process is preferably employed.

For production by the acetone process, the components A2) to A4) and the polyisocyanate component A1) are usually initially charged in full or in part for the production of an isocyanate-functional polyurethane prepolymer, and optionally diluted with a solvent which is water-miscible but inert with respect to isocyanate groups and heated to temperatures in the range from 50 to 120° C. To accelerate the isocyanate addition reaction it is possible to use the catalysts known in polyurethane chemistry.

Suitable solvents are the conventional aliphatic, keto-functional solvents such as acetone or 2-butanone, which may be added not only at the beginning of production but optionally also later in portions. Acetone and 2-butanone are preferred and acetone is particularly preferred. The addition of other solvents without isocyanate-reactive groups is also possible.

The components from A1) to A4) which were optionally not yet added at the beginning of the reaction are subsequently metered in.

In the production of the polyurethane prepolymer from A1) to A4) the mole ratio of isocyanate groups to isocyanate-reactive groups is generally preferably 1.05 to 3.5, particularly preferably 1.1 to 3.0 and most particularly preferably 1.1 to 2.5.

The reaction of components A1) to A4) to form the prepolymer takes place in part or in full, but preferably in full. In this way, polyurethane prepolymers that contain free isocyanate groups are obtained as the substance itself or in solution.

In the neutralising step for the partial or complete conversion of potentially anionic groups to anionic groups, bases such as tertiary amines, e.g. trialkylamines with preferably 1 to 12, particularly preferably 1 to 6 C atoms and most particularly preferably 2 to 3 C atoms in each alkyl residue, or alkali metal bases such as the corresponding hydroxides, particularly preferably alkali metal bases such as the corresponding hydroxides, are preferably used.

As neutralising agent, most particularly preferably inorganic bases, such as aqueous ammonia solution or sodium or potassium hydroxide, can be used.

The amount of substance of the bases is preferably between 50 and 125 mole %, particularly preferably between 70 and 100 mole %, of the amount of substance of the acid groups to be neutralised. The neutralisation can also take place at the same time as the dispersion if the water of dispersion already contains the neutralising agent.

Afterwards in a further process step, if this has not yet happened or has only happened in part, the prepolymer obtained is dissolved with the aid of aliphatic ketones such as acetone or 2-butanone.

In the chain extension in step B), $NH_2$— and/or NH-functional components are reacted with the remaining isocyanate groups of the prepolymer. The chain extension/termination is preferably performed before the dispersion in water.

If anionic hydrophilising agents corresponding to the definition of B2) with $NH_2$ or NH groups are used for the chain extension, the chain extension of the prepolymers preferably takes place before the dispersion.

The degree of chain extension, i.e. the equivalent ratio of NCO-reactive groups of the compounds used for chain extension and chain termination to free NCO groups of the prepolymer, is generally preferably between 40 and 150%, particularly preferably between 50 and 110%, most particularly preferably between 60 and 100%.

The amine components B1) and B2) may optionally be used in water- or solvent-diluted form in the process according to the invention, individually or in mixtures, with addition in any order being possible in principle.

If water or organic solvents are used as diluting agent, the content of diluting agent in the component used in B) for chain extension is preferably 40 to 95 wt. %.

The dispersion preferably takes place following the chain extension. For this purpose, the dissolved and chain-extended polyurethane polymer, optionally under strong shear such as e.g. vigorous stirring, is either added to the water of dispersion or conversely the water of dispersion is stirred into the chain-extended polyurethane polymer solutions. Preferably the water is added to the dissolved chain-extended polyurethane polymer.

The solvent still contained in the dispersions after the dispersing step is generally then removed by distillation. It is also possible to remove it during the dispersion itself.

The residual content of organic solvents in the polyurethane dispersions thus produced is preferably 0 to 10 wt. %, particularly preferably 0 to 3 wt. %, based on the overall dispersion.

The pH of the aqueous polyurethane dispersions used according to the invention is preferably less than 8.0, particularly preferably less than 7.5, most particularly preferably between 5.5 and 7.5.

Additives and auxiliary and supplementary substances may be added to the polyurethane dispersion according to the invention, such as foam inhibitors, thickeners or thixotropic agents, antioxidants, light stabilisers, emulsifiers, plasticisers, pigments, fillers, additives for skein stabilising, biocides, pH regulators and/or flow control agents. These additives are preferably present in a concentration of up to 15 wt. %, particularly preferably 0.01% to 10 wt. %, based on the total weight.

Suitable support materials are preferably textile fabrics, flat substrates of metal, glass, ceramics, concrete, natural stone, leather, natural fibres and plastics such as PVC, polyolefins, polyurethane or similar. Three-dimensional structures are also suitable as support materials. Fibrous materials are particularly preferred as supports for the compositions according to the invention.

The term textile fabrics within the meaning of the present invention is understood as for example woven and knitted fabrics and bonded and unbonded non-wovens. The textile fabrics can be made of synthetic fibres, natural fibres and/or mixtures thereof. In principle, textiles made from any fibres are suitable for the process according to the invention. By means of the composition according to the invention, the supports can be treated or finished in any conventional manner, preferably by coating or bonding the fibres together or bonding substrates together.

The composition is applied on to the support using conventional applicator or coating devices, for example a knife, e.g. a coating knife, rollers or other equipment. Spraying or dipping is also possible. Application can take place on one or both sides.

The dried textile supports can be surface-treated before, during or after application of the composition according to the invention, e.g. by pre-coating, buffing, velveting, raising and/or tumble drying.

The compositions according to the invention can also be applied on to a support material in several coats.

The present invention also provides substrates coated or bonded with the coating compounds or compositions according to the invention. Owing to their excellent application properties, the compositions according to the invention or the layers or bonds made therefrom are preferably suitable for the coating or production of outerwear, synthetic leather articles, shoes, upholstery fabrics, car interior fitting items and sports items, this list being intended only by way of example and not as limitative.

EXAMPLES

All quantitative data, proportions and percentages, unless otherwise specified, are based on the weight and the total quantity or on the total weight of the compositions.

Unless stated otherwise, all analytical measurements refer to measurements at temperatures of 23° C.

The solids contents are determined by heating a weighed sample to 125° C. until constant weight is reached. When the weight is constant, the solids content is calculated by weighing the sample again.

NCO contents were determined volumetrically in accordance with DIN-EN ISO 11909 unless expressly mentioned otherwise.

Monitoring for free NCO groups was performed by means of IR spectroscopy (band at 2260 cm$^{-1}$).

The viscosities given were determined by rotational viscometry in accordance with DIN 53019 at 23° C. with a rotational viscometer from Anton Paar Germany GmbH, Ostfildern, DE.

The determination of the average particle sizes (the number-average is stated) of the polyurethane dispersions took place by laser correlation spectroscopy (instrument: Malvern Zetasizer 1000, Malvern Inst. Limited) after diluting with deionised water.

The storage stability of the dispersions was tested over a period of 6 months after production by storage at room temperature.

Substances and Abbreviations Used:
Diaminosulfonate: $NH_2$—$CH_2CH_2$—$NH$—$CH_2CH_2$—$SO_3Na$ (45% in water)
PolyTHF® 2000: polytetramethylene glycol polyol, OH number 56 mg KOH/g, number-average molecular weight 2000 g/mol (BASF AG, Ludwigshafen, DE)
PolyTHF® 1000: polytetramethylene glycol polyol, OH number 112 mg KOH/g, number-average molecular weight 1000 g/mol (BASF AG, Ludwigshafen, DE)
Polyether LB 25: monofunctional polyether based on ethylene oxide/propylene oxide, number-average molecular weight 2250 g/mol, OH number 25 mg KOH/g (Bayer MaterialScience AG, Leverkusen, DE)

Comparative Example 1

425 g PolyTHF® 1000 (component A2a)) were heated to 70° C. Then, a mixture of 64.0 g hexamethylene diisocyanate (component A1)) and 84.5 g isophorone diisocyanate (component A1)) was added and the mixture was stirred at 100-115° C. to just below the theoretical NCO value. The finished prepolymer was dissolved with 1020 g acetone at 50° C. and then a solution of 8.4 g ethylenediamine (component B1)), 40.6 g diaminosulfonate (component B2)) and 173 g water was metered in. The secondary stirring period was 15 min. Next, dispersion was carried out by adding 250 g water. The removal of the solvent by distillation in vacuo followed, with thickening taking place during the distillation and no dispersion being obtained.

The use of two isocyanate components in A1) but only one polytetramethylene glycol polyol component in A2) did not lead to a stable dispersion.

Comparative Example 2

78.7 g PolyTHF® 1000 (component A2a)) and 366.3 g PolyTHF® 2000 (component A2b)) were heated to 70° C. Then, 99.4 g hexamethylene diisocyanate (component A1)) were added and the mixture was stirred at 100-115° C. to just below the theoretical NCO value. The finished prepolymer was dissolved with 888 g acetone at 50° C. and then a solution of 3.5 g ethylenediamine (component B1)), 40.6 g diaminosulfonate (component B2)) and 247 g water was metered in. The secondary stirring period was 15 min. Next, dispersion was carried out by adding 209 g water. The removal of the solvent by distillation in vacuo followed and a coarse-particle dispersion was obtained which, after 24 hours, was present in separated phases.
Solids content: 53%
Particle Size (LCS): 1050 nm
Viscosity: 1400 mPas The use of only one isocyanate component in A1) with the simultaneous use of two polytetramethylene glycol polyol components with different average molecular weights in A2) did not lead to a stable dispersion.

Example 3 (According to the Invention)

450 g PolyTHF® 1000 (component A2a)) and 2100 g PolyTHF® 2000 (component A2b)) were heated to 70° C. Then, a mixture of 225.8 g hexamethylene diisocyanate (component A1)) and 298.4 g isophorone diisocyanate (component A1)) was added and the mixture was stirred at 100-115° C. to just below the theoretical NCO value. The finished prepolymer was dissolved with 5460 g acetone at 50° C. and then a solution of 29.5 g ethylenediamine (component B1)), 143.2 g diaminosulfonate (component B2)) and 610 g water was metered in. The secondary stirring period was 15 min. Next, dispersion was carried out by adding 1880 g water. The removal of the solvent by distillation in vacuo followed and a dispersion having a long shelf life was obtained.
Solids content: 56%
Particle Size (LCS): 276 nm
Viscosity: 1000 mPas The combination of the use of two different isocyanate components in A1) with simultaneous use of two polytetramethylene glycol polyol components with different average molecular weights in A2) led to a stable dispersion.

Example 4 (According to the Invention)

450 g PolyTHF® 1000 (component A2a)) and 2100 g PolyTHF® 2000 (component A2b)) were heated to 70° C. Then, a mixture of 225.8 g hexamethylene diisocyanate (component A1)) and 298.4 g isophorone diisocyanate (component A1)) was added and the mixture was stirred at 100-115° C. to below the theoretical NCO value. The finished prepolymer was dissolved with 5460 g acetone at 50° C. and then a solution of 351 g diaminosulfonate (component B2)) and 610 g water was metered in. The secondary stirring period was 15 min. Next, dispersion was carried out by adding 1880 g water. The removal of the solvent by distillation in vacuo followed and a dispersion having a long shelf life was obtained.
Solids Content: 42%
Viscosity: 1370 mPas Example 5 (According to the Invention)

1645 g PolyTHF® 2000 (component A2b)), 352.5 g PolyTHF® 1000 (component A2a)) and 158.6 g polyether LB 25 (component A4)) were heated to 70° C. Then, a mixture of 177 g hexamethylene diisocyanate (component A1)) and 234 g isophorone diisocyanate (component A1)) was added at 70° C. within 5 min and the mixture was stirred to below the theoretical NCO value. The finished prepolymer was dissolved with 4560 g acetone at 50° C. and then a solution of 23.1 g ethylenediamine (component B)) and 45.2 g isophorone diamine (component B)) and 294 g water was metered in within 10 min. The secondary stirring period was 10 min. Dispersion was then carried out within 10 min by adding 1650 g water. The removal of the solvent by distillation in vacuo followed and a dispersion having a long shelf life was obtained with a solids content of 49%.

Particle Size (LCS): 255 nm
Viscosity 420 mPas

Example 6 (According to the Invention)

280.0 g PolyTHF® 2000 (component A2b)), 40.0 g PolyTHF® 1000 (component A2b)), 1.8 g trimethylolpropane (component A3)) and 140.4 g polyether LB 25 (component A4)) were heated to 70° C. Then, a mixture of 23.5 g hexamethylene diisocyanate (component A1)) and 31.1 g isophorone diisocyanate (component A1)) was added at 70° C. within 5 min and the mixture was stirred to below the theoretical NCO value. The finished prepolymer was dissolved with 920 g acetone at 50° C. and then a solution of 2.6 g ethylenediamine (component B)) in 19.3 g water was metered in within 10 min. The secondary stirring period was 10 min. Dispersion was then carried out within 10 min by adding 1040 g water. The removal of the solvent by distillation in vacuo followed and a dispersion having a long shelf life was obtained with a solids content of 43%. Water losses from the distillation were compensated by topping up with water and the viscosity was adjusted by adding water until the mixture could be readily stirred.
Particle size (LCS): 69 nm
Viscosity 2150 mPas Example 7 (According to the Invention)

262.5 g PolyTHF® 2000 (component A2a)) and 163.1 g PolyTHF® 2900 (component A2b)) were heated to 70° C. Then, a mixture of 28.2 g hexamethylene diisocyanate (component A1)) and 37.3 g isophorone diisocyanate (component A1)) was added and the mixture was stirred at 100-115° C. to just below the theoretical NCO value. The finished prepolymer was dissolved with 870 g acetone at 50° C. and then a solution of 3.0 g ethylenediamine (component B1)), 22.8 g diaminosulfonate (component B2)) and 85 g water was metered in. The secondary stirring period was 15 min. Next, dispersion was carried out by adding 450 g water. The removal of the solvent by distillation in vacuo followed, topping up with water, and a dispersion having a long shelf life was obtained.
Solids Content: 51%
Particle Size (LCS): 201 nm
Viscosity: 512 mPas Example 8 (According to the Invention)

72.8 g PolyTHF® 1000 (component A2a)) and 340 g PolyTHF® 2000 (component A2b)) were heated to 70° C. Then, a mixture of 36.5 g hexamethylene diisocyanate (component A1)) and 48.2 g isophorone diisocyanate (component A1)) was added and the mixture was stirred at 100-115° C. to just below the theoretical NCO value. The finished prepolymer was dissolved with 880 g acetone at 50° C. and then a solution of 2.5 g ethylenediamine (component B1)), 2.8 g diethylenetriamine (component B1)), 22.0 g diaminosulfonate (component B2)) and 102 g water was metered in. The secondary stirring period was 15 min. Next, dispersion was carried out by adding 400 g water. The removal of the solvent by distillation in vacuo followed and a dispersion having a long shelf life was obtained.
Solids Content: 50%
Particle Size (LCS): 294 nm
Viscosity: 312 mPas Example 9 (According to the Invention)

75.0 g PolyTHF® 1000 (component A2a)) and 350 g PolyTHF® 2000 (component A2b)) were heated to 70° C. Then, a mixture of 37.6 g hexamethylene diisocyanate (component A1)) and 49.7 g isophorone diisocyanate (component A1)) was added and the mixture was stirred at 100-115° C. to just below the theoretical NCO value. The finished prepolymer was dissolved with 910 g acetone at 50° C. and then a solution of 13.9 g isophorone diamine (component B1)), 23.9 g diaminosulfonate (component B2)) and 170 g water was metered in. The secondary stirring period was 15 min. Next, dispersion was carried out by adding 360 g water. The removal of the solvent by distillation in vacuo followed and a dispersion having a long shelf life was obtained.
Solids Content: 49%
Particle Size (LCS): 208 nm
Viscosity: 132 mPas Example 10 (According to the Invention)

84.4 g PolyTHF® 1000 (component A2a)), 393 g PolyTHF® 2000 (component A2b)) and 10.0 g polyether LB 25 (component A4)) were heated to 70° C. Then, a mixture of 53.3 g hexamethylene diisocyanate (component A1)) and 70.4 g isophorone diisocyanate (component A1)) was added and the mixture was stirred at 100-115° C. to just below the theoretical NCO value. The finished prepolymer was dissolved with 1000 g acetone at 50° C. and then a solution of 26.2 g isophorone diamine (component B1)), 5.6 g ethylenediamine (component B1)), 13.9 g diaminosulfonate (component B2)) and 250 g water was metered in. The secondary stirring period was 15 min. Next, dispersion was carried out by adding 130 g water. The removal of the solvent by distillation in vacuo followed and a dispersion having a long shelf life was obtained.
Particle Size (LCS): 232 nm
Viscosity: 160 mPas Comparative Application Tests:

For the test, the dispersions were adjusted to a spreadable viscosity using Borchi Gel ALA as thickener and a 500 μm thick wet film was applied on to matt release paper. The drying took place at 50° C. and then conditioning was carried out for 3 minutes at 150° C. The films obtained were subjected to a tensile test according to DIN 53504.

| Film from Example | 100% modulus [MPa] | Tensile strength [MPa] | Elongation at break [%] |
|---|---|---|---|
| 3 | 1.8 | 38.2 | 1450 |
| 5 | 0.9 | 6.8 | 1090 |
| 9 | 1.7 | 46.7 | 1390 |
| 10 | 2.5 | 33.7 | 1030 |

The films made of the polyurethane dispersions according to the invention displayed good mechanical properties, high elasticity and rapid recovery after elongation by 100 and 300%. Moreover, the films made of the dispersions according to the invention exhibited a pleasant feel.

In addition, a whipped foam was produced using the dispersion from Example 10 by whipping up to a weight per liter of 500 g/l. The foam was stabilised with Stokal SR and STA and thickened with Borchi Gel ALA. A 500 μm thick wet film of the foam was applied on to release paper. Drying took place at 50° C. and then conditioning was carried out for 3 minutes at 150° C. The films obtained were subjected to a tensile test according to DIN 53504.

| Foam from Example | 100% modulus [MPa] | Tensile strength [MPa] | Elongation at break [%] |
|---|---|---|---|
| 10 | 0.9 | 5.2 | 750 |

The invention claimed is:

1. An aqueous polyurethane dispersion comprising polyurethanes obtainable from
A1) at least two organic di- or polyisocyanates that are different from one another,
A2) at least two poly(tetramethylene glycol) polyether diols A2a) and A2b) that are different from one another, each with the structure (HO—(CH$_2$—CH$_2$—CH$_2$—CH$_2$—O)$_x$—H), wherein the relevant diol precursors are present with number-average molecular weights M$_n$ of 400 to 8000 g/mol and the diol with the lower molar mass A2a) has a number-average molecular weight M$_n$ which is 10 to 80% of the number-average molecular weight M$_n$ of the diol with the higher molar mass A2b),
A3) optionally hydroxy-functional compounds with molecular weights of 62 to 399 g/mol, and
A4) optionally non-ionic hydrophilising agents,
and
one or more amino-functional compounds B),
wherein, based on the total mass of the polyurethane, less than 10 wt. % of diol precursors with number-average molecular weights M$_n$ of 400 to 8000 g/mol are contained which do not correspond to A2).

2. The aqueous polyurethane dispersion according to claim 1, wherein the number-average molecular weight of the polyurethane is in the range between 1000 and 200000 g/mol.

3. The aqueous polyurethane dispersion according to claim 1, wherein component A2) consists of two poly(tetramethylene glycol) polyether diols A2a) and A2b) that are different from one another, each with the structure (HO—(CH$_2$—CH$_2$—CH$_2$—CH$_2$—O)$_x$—H), wherein the relevant diol precursors are present with number-average molecular weights M$_n$ of 400 to 8000 g/mol and the diol with the lower molar mass A2a) has a number-average molecular weight M$_n$ which is 10 to 80% of the number-average molecular weight M$_n$ of the diol with the higher molar mass A2b).

4. The aqueous polyurethane dispersion according to claim 1, wherein component A1) comprises at least two organic diisocyanates that are different from one another.

5. The aqueous polyurethane dispersion according to claim 1, wherein component A1) consists of two organic diisocyanates that are different from one another.

6. The aqueous polyurethane dispersion according claim 1, wherein the polyurethanes contain anionic groups, which are optionally sulfonate groups.

7. A process for the production of an aqueous polyurethane dispersion according to claim 1, comprising producing an isocyanate-functional prepolymer from
A1) at least two organic di- or polyisocyanates that are different from one another,
A2) at least two poly(tetramethylene glycol) polyether diols A2a) and A2b) that are different from one another, each with the structure (HO—(CH$_2$—CH$_2$—CH$_2$—CH$_2$—O)$_x$—H), wherein the relevant diol precursors are present with number-average molecular weights M$_n$ of 400 to 8000 g/mol, and the diol with the lower molar mass A2a) has a number-average molecular weight M$_n$ which is 10 to 80%, of the number-average molecular weight M$_n$ of the diol with the higher molar mass A2b),
A3) optionally hydroxy-functional compounds with molecular weights of 62 to 399 g/mol, and
A4) optionally non-ionic hydrophilising agents,
and reacting
C) free NCO groups of said isocyanate-functional prepolymer in full or in part with one or more amino-functional compounds B), optionally comprising primary and/or secondary amines and/or diamines,
wherein the polyurethane thus obtained is dispersed in water before, during or after step B).

8. A composition, comprising an aqueous polyurethane dispersion according to claim 1, which is capable of being used as a coating composition, adhesive and/or sealant on a fibre-based substrate.

9. An object and/or article comprising a fibre-based substrate which is produced, coated, bonded and/or sealed using an aqueous polyurethane dispersion according to claim 1.

10. The aqueous polyurethane dispersion according to claim 1, wherein the number-average molecular weight of the polyurethane is in the range between 5000 and 150000 g/mol.

11. The aqueous polyurethane dispersion according to claim 1, wherein the relevant diol precursors are present with number-average molecular weights M$_n$ of 600 to 3000 g/mol, and wherein the diol with the lower molar mass A2a) has a number-average molecular weight M$_n$ which is 30 to 70% of the number-average molecular weight M$_n$ of the diol with the higher molar mass A2b).

12. The aqueous polyurethane dispersion according to claim 1, wherein, based on the total mass of the polyurethane, less than 5 wt. % of diol precursors with number-average molecular weights M$_n$ of 400 to 8000 g/mol are contained which do not correspond to A2).

13. The aqueous polyurethane dispersion according to claim 1, wherein no diol precursors are contained which do not correspond to A2).

14. The aqueous polyurethane dispersion according to claim 1, wherein A1) is selected from the group consisting of 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, 1,4-cyclohexylene diisocyanate, 1,4-phenylene diisocyanate, 2,4- and/or 2,6-toluene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI) and alkyl-2,6-diisocyanatohexanoate (lysine diisocyanate) with C1-C8 alkyl groups, portions of modified diisocyanates having a functionality of ≥2 with uretdione, isocyanurate, urethane, allophanate, biuret, iminooxadiazinedione or oxadiazinetrione structure, and mixtures thereof.

15. The aqueous polyurethane dispersion according to claim 1, wherein A1) is selected from the group consisting of hexamethylene diisocyanate, isophorone diisocyanate, isomeric bis(4,4'-isocyanatocyclohexyl)methanes, and mixtures thereof.

16. The aqueous polyurethane dispersion according to claim 1, wherein component B) is selected from primary or secondary amine and/or diamines.

17. The aqueous polyurethane dispersion according to claim 1, wherein component B) is a mixture of component B1), amines that have no ionic or ionogenic group, and component B2), amines that have ionic or ionogenic groups, wherein B1) comprises di- or polyamines, primary/secondary amines, or monofunctional, isocyanate-reactive amine compounds, and B2) comprises alkali metal salts of mono- and diaminosulfonic acids.

18. The aqueous polyurethane dispersion according to claim 17, wherein component B1) is selected from 1,2-ethylene-diamine, 1,2- and 1,3-diaminopropane, 1,4-diaminobutane, 1,6-diaminohexane, isophorone diamine, mixtures of isomers of 2,2,4- and 2,4,4-trimethylhexamethylenediamine, 2-methylpentamethylenediamine, diethylenetriamine, 4,4-diaminodicyclohexylmethane, hydrazine hydrate, dimethylethylenediamine, diethanolamine, 3-amino-1-methylaminopropane, 3-amino-1-ethylaminopropane, 3-amino-1-cyclohexylaminopropane, 3-amino-1-methylaminobutane, N-aminoethylethanolamine, ethanolamine, 3-aminopropanol, neopentanolamine, methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine or suitable substituted derivatives thereof, amide amines from diprimary amines and monocarboxylic acids, or N,N-dimethylaminopropylamine;

and component B2) is selected from salts of 2-(2-aminoethylamino)ethanesulfonic acid, ethylenediamine propyl- or -butylsulfonic acid, 1,2- or 1,3-propylenediamine-β-ethylsulfonic acid or taurine.

19. The aqueous polyurethane dispersion according to claim 1, wherein A3) is present.

20. The aqueous polyurethane dispersion according to claim 1, wherein A2a) has a number average molecular weight of 400 to 1,500 and A2b) has a number average molecular weight of 1,500 to 8,000.

* * * * *